(12) United States Patent
Ma et al.

(10) Patent No.: US 11,622,378 B2
(45) Date of Patent: Apr. 4, 2023

(54) MANAGEMENT OF FREQUENCY RESOURCE INTERFERENCE

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Ayan Sengupta, San Diego, CA (US); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/304,528

(22) Filed: Jun. 22, 2021

(65) Prior Publication Data

US 2022/0007372 A1 Jan. 6, 2022

Related U.S. Application Data

(60) Provisional application No. 63/047,502, filed on Jul. 2, 2020.

(51) Int. Cl.
*H04W 72/541* (2023.01)
*H04W 72/543* (2023.01)
(Continued)

(52) U.S. Cl.
CPC ......... *H04W 72/541* (2023.01); *H04L 1/0003* (2013.01); *H04L 1/0068* (2013.01); *H04W 72/0453* (2013.01); *H04W 72/543* (2023.01)

(58) Field of Classification Search
CPC ........... H04W 72/082; H04W 72/0453; H04W 72/087; H04L 1/0003; H04L 1/0068
See application file for complete search history.

(56) References Cited

U.S. PATENT DOCUMENTS

| | | | |
|---|---|---|---|
| 10,051,643 B2* | 8/2018 | Negus | H04L 5/0028 |
| 2015/0085761 A1* | 3/2015 | Maltsev | H04B 7/0452 |
| | | | 370/329 |

(Continued)

FOREIGN PATENT DOCUMENTS

| | | |
|---|---|---|
| WO | 2014168538 A1 | 10/2014 |
| WO | 2021057460 A1 | 4/2021 |

OTHER PUBLICATIONS

Co-Pending U.S. Appl. No. 17/304,955, inventor Ma; Liangping, filed Jun. 29, 2021.

(Continued)

*Primary Examiner* — Jackie Zuniga Abad
(74) *Attorney, Agent, or Firm* — Harrity & Harrity LLP

(57) ABSTRACT

Various aspects of the present disclosure generally relate to wireless communication. In some aspects, a user equipment may receive an indication of a set of interfered frequency resources that are subject to interference by a set of interfering frequency resources and communicate with a wireless communication device using at least one of: a bandwidth part configuration that is based at least in part on the set of interfered frequency resources, a communication procedure that is based at least in part on the set of interfered frequency resources, or a combination thereof. Numerous other aspects are provided.

30 Claims, 7 Drawing Sheets

(51) Int. Cl.
*H04W 72/0453* (2023.01)
*H04L 1/00* (2006.01)

(56) References Cited

U.S. PATENT DOCUMENTS

2015/0382362 A1  12/2015  Park et al.
2019/0098637 A1   3/2019  Chapman et al.

OTHER PUBLICATIONS

Co-Pending U.S. Appl. No. 17/324,982, inventor Shrestha; Bharat, filed May 19, 2021.
Co-Pending U.S. Appl. No. 17/359,291, inventor Ma; Liangping, filed Jun. 25, 2021.
Co-Pending U.S. Appl. No. 17/359,377, inventor Ma; Liangping, filed Jun. 25, 2021.
International Search Report and Written Opinion—PCT/US2021/070758—ISA/EPO—dated Oct. 7, 2021.

\* cited by examiner

MANAGEMENT OF FREQUENCY RESOURCE INTERFERENCE

CROSS-REFERENCE TO RELATED APPLICATION

This patent application claims priority to U.S. Provisional Patent Application No. 63/047,502, filed on Jul. 2, 2020, entitled "MANAGEMENT OF FREQUENCY RESOURCE INTERFERENCE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for management of frequency resource interference.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication may include a memory and one or more processors coupled to the memory. The one or more processors may be configured to receive an indication of a set of interfered frequency resources that are subject to interference by a set of interfering frequency resources; and communicate with a wireless communication device using at least one of: a bandwidth part configuration that is based at least in part on the set of interfered frequency resources, a communication procedure that is based at least in part on the set of interfered frequency resources, or a combination thereof.

In some aspects, a wireless communication device for wireless communication may include a memory and one or more processors coupled to the memory. The one or more processors may be configured to transmit an indication of a set of interfered frequency resources that are subject to interference by a set of interfering frequency resources; and communicate with a UE using at least one of: a bandwidth part configuration that is based at least in part on the set of interfered frequency resources, a communication procedure that is based at least in part on the set of interfered frequency resources, or a combination thereof.

In some aspects, a method of wireless communication, performed by a UE, may include receiving an indication of a set of interfered frequency resources that are subject to interference by a set of interfering frequency resources; and communicating with a wireless communication device using at least one of: a bandwidth part configuration that is based at least in part on the set of interfered frequency resources, a communication procedure that is based at least in part on the set of interfered frequency resources, or a combination thereof.

In some aspects, a method of wireless communication, performed by a wireless communication device, may include transmitting an indication of a set of interfered frequency resources that are subject to interference by a set of interfering frequency resources; and communicating with a UE using at least one of: a bandwidth part configuration that is based at least in part on the set of interfered frequency resources, a communication procedure that is based at least in part on the set of interfered frequency resources, or a combination thereof.

In some aspects, a non-transitory computer-readable medium may store one or more instructions for wireless communication. The one or more instructions, when executed by one or more processors of a UE, may cause the one or more processors to receive an indication of a set of interfered frequency resources that are subject to interference by a set of interfering frequency resources; and communicate with a wireless communication device using at least one of: a bandwidth part configuration that is based at least in part on the set of interfered frequency resources, a communication procedure that is based at least in part on the set of interfered frequency resources, or a combination thereof.

In some aspects, a non-transitory computer-readable medium may store one or more instructions for wireless communication. The one or more instructions, when executed by one or more processors of a wireless communication device, may cause the one or more processors to transmit an indication of a set of interfered frequency resources that are subject to interference by a set of interfering frequency resources; and communicate with a UE using at least one of: a bandwidth part configuration that is based at least in part on the set of interfered frequency resources, a communication procedure that is based at least in part on the set of interfered frequency resources, or a combination thereof.

In some aspects, an apparatus for wireless communication may include means for receiving an indication of a set of interfered frequency resources that are subject to interference by a set of interfering frequency resources; and means for communicating with a wireless communication device using at least one of: a bandwidth part configuration that is based at least in part on the set of interfered frequency resources, a communication procedure that is based at least in part on the set of interfered frequency resources, or a combination thereof.

In some aspects, an apparatus for wireless communication may include means for transmitting an indication of a set of interfered frequency resources that are subject to interference by a set of interfering frequency resources; and means for communicating with a UE using at least one of: a bandwidth part configuration that is based at least in part on the set of interfered frequency resources, a communication procedure that is based at least in part on the set of interfered frequency resources, or a combination thereof.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
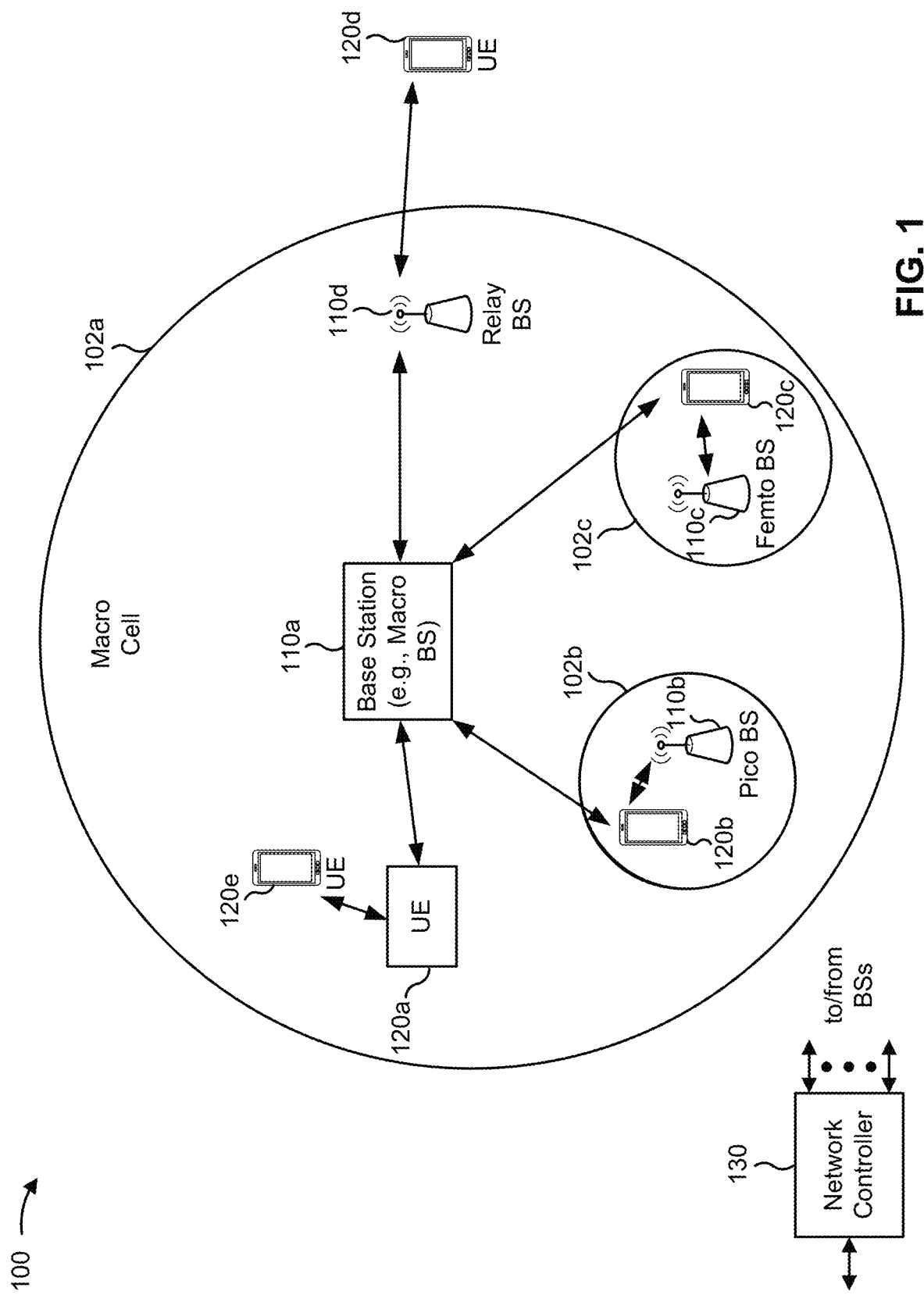
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial BS, a non-terrestrial relay station, and/or the like.

The wireless network 100 may include any number of non-terrestrial wireless communication devices. A non-terrestrial wireless communication device may include a satellite, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of BSs (e.g., stationary or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
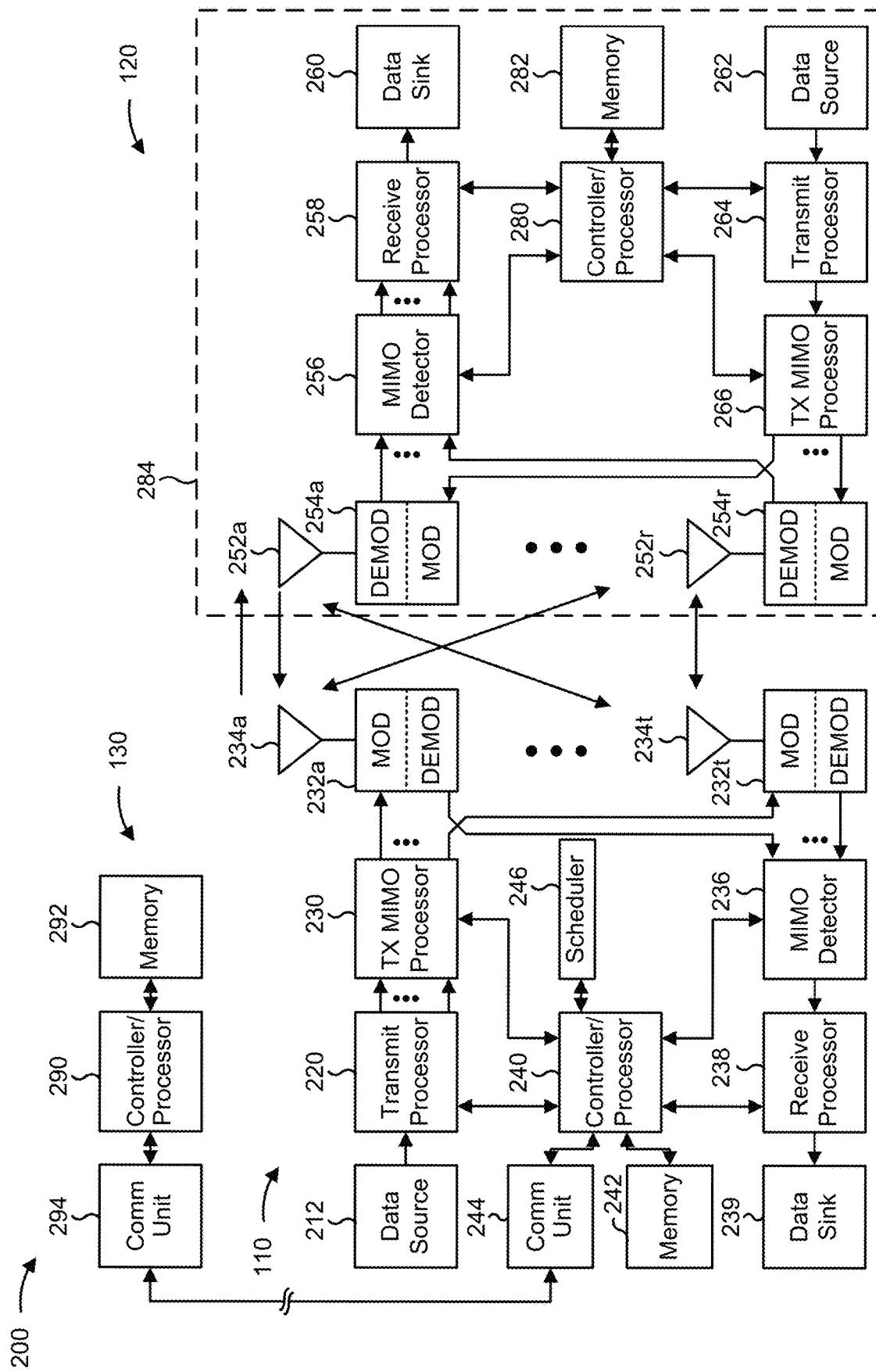
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with management of frequency resource interference, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving an indication of a set of interfered frequency resources that are subject to interference by a set of interfering frequency resources, means for communicating with a base station using at least one of: a bandwidth part configuration that is based at least in part on the set of interfered frequency resources, a communication procedure that is based at least in part on the set of interfered frequency resources, or a combination thereof, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a wireless communication device (e.g., a base station 110, and/or the like) may include means for transmitting an indication of a set of interfered frequency resources that are subject to interference by a set of interfering frequency resources, means for communicating with a UE using at least one of: a bandwidth part configuration that is based at least in part on the set of interfered frequency resources, a communication procedure that is based at least in part on the set of interfered frequency resources, or a combination thereof, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
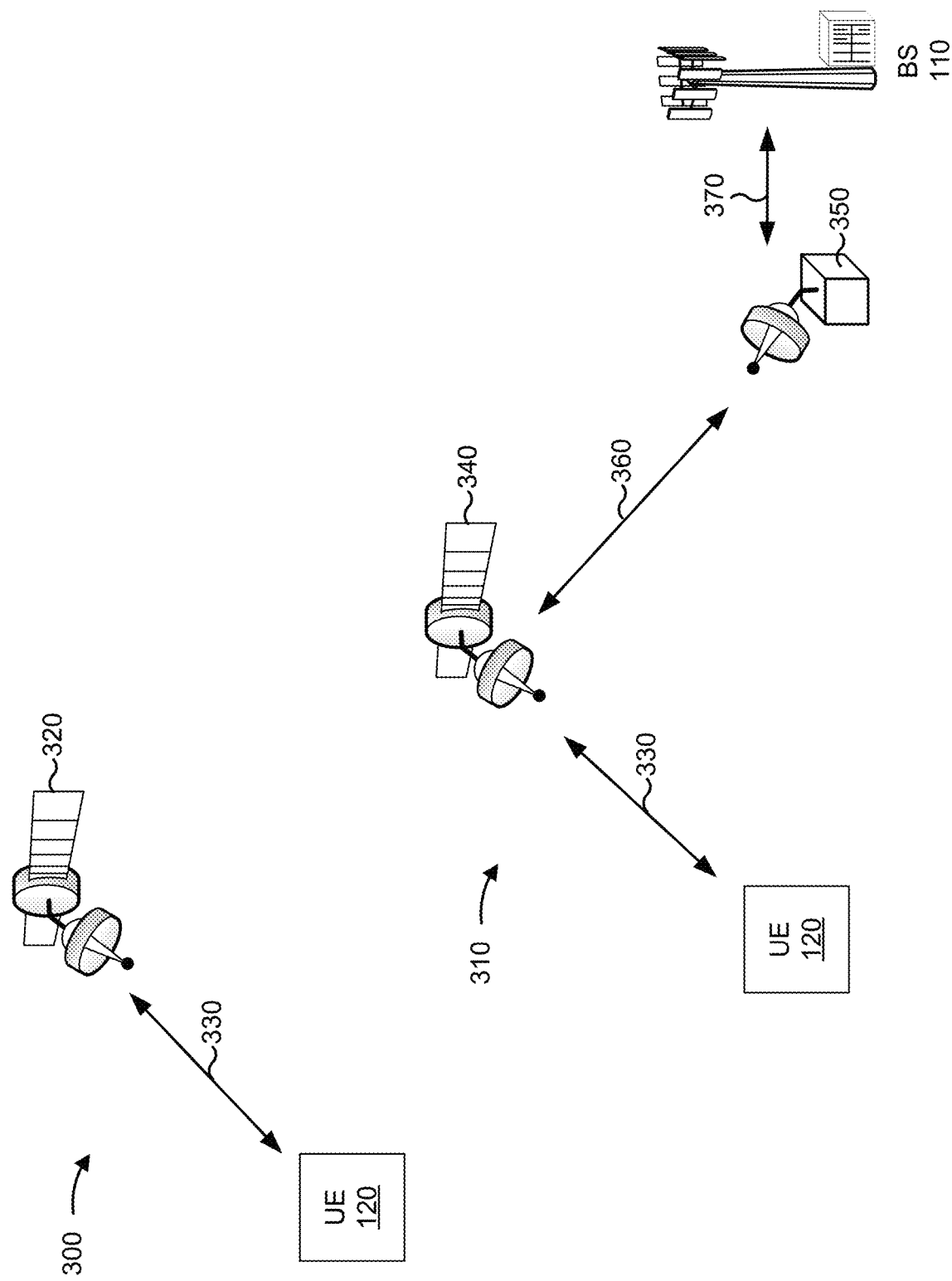
FIG. 3 is a diagram illustrating an example of a regenerative satellite deployment and an example of a transparent satellite deployment in a non-terrestrial network (NTN), in accordance with the present disclosure.

FIG. 3 is a diagram illustrating examples 300 and 310 of NTN deployments. The example 300 and/or the example 310 may be, be similar to, include, or be included in, a wireless network such as the wireless network 100 shown in, and described in connection with, FIG. 1.

Example 300 shows a conceptual depiction of a regenerative satellite deployment. In example 300, a UE 120 is served by a satellite 320 via a service link 330. For example, the satellite 320 may include a BS 110 (e.g., BS 110a), a gNB, one or more functions (e.g., radio frequency (RF) filtering, frequency conversion, amplification, demodulation, decoding, switching, routing, coding, modulation, and/or the like) of a BS 110, and/or the like. The service link 330 may include an NR-Uu interface that is terminated at the satellite 320. In some aspects, the satellite 320 may be referred to as a non-terrestrial base station, a regenerative repeater, an on-board processing repeater, and/or the like. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be referred to as a transparent satellite, a bent-pipe satellite, a non-terrestrial relay station, and/or the like. The satellite 340 may relay a signal received from a terrestrial BS 110, via an NTN gateway 350. The satellite may repeat an NR-Uu interface via a feeder link 360. The NTN gateway 350 may communicatively connect the satellite 340 and the BS 110 using an RF link 370. For example, the satellite 340 may receive an uplink radio frequency transmission, and may transmit a downlink radio frequency transmission without demodulating the uplink radio frequency transmission. In some aspects, the satellite 340 may frequency convert the uplink radio frequency transmission received on the service link 330 to a frequency of the downlink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, a Global Positioning System (GPS) capability, and/or the like, though not all UEs have such capabilities. The satellite 340 may provide and/or facilitate a cell that covers the UE 120.

The service link 330 may include a link between the satellite 340 and the UE 120, and may include one or more of an uplink or a downlink. The feeder link 360 may include a link between the satellite 340 and the gateway 350, and may include one or more parts of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
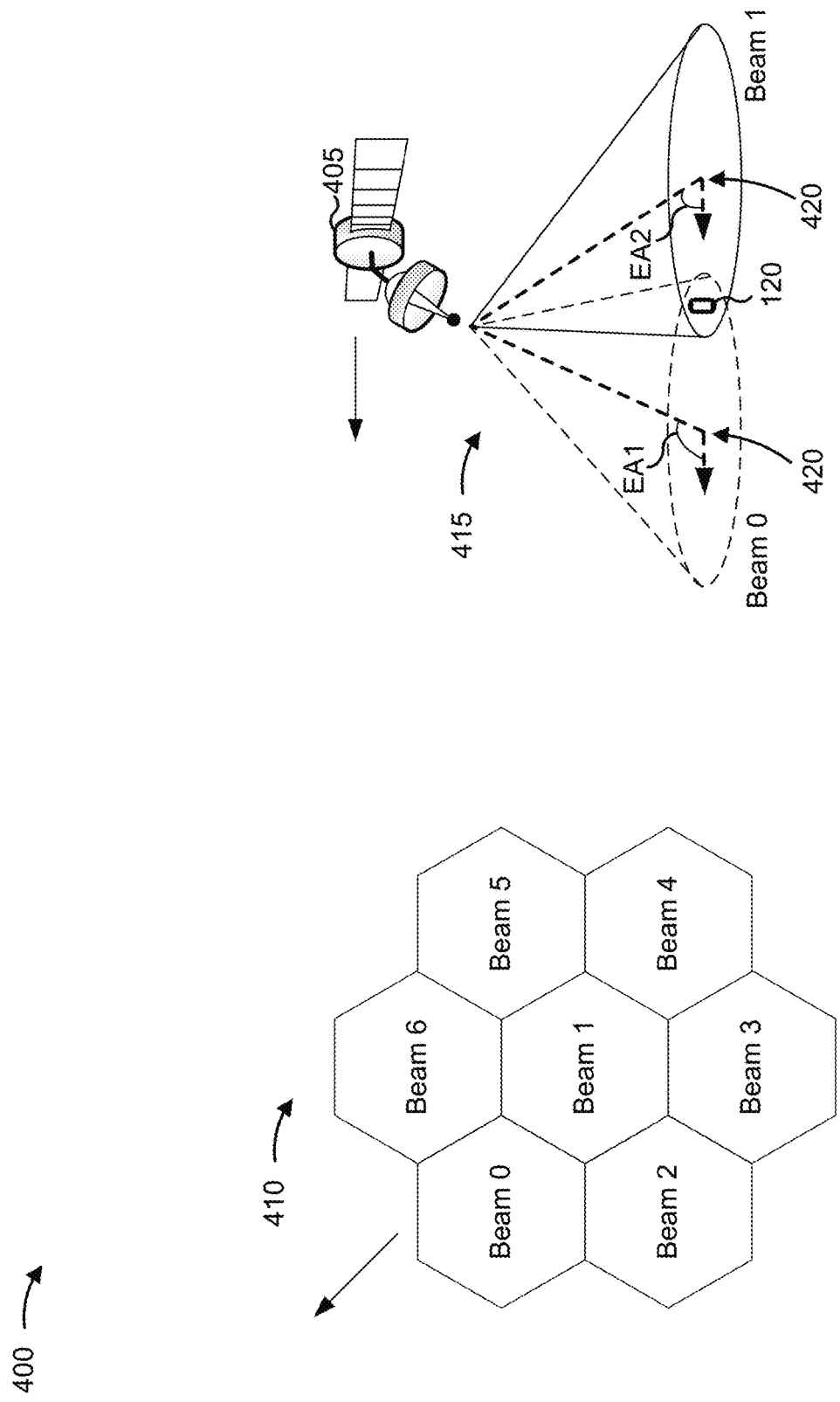
FIG. 4 is a diagram illustrating an example of beam management in an NTN, in accordance with the present disclosure.

FIG. 4 is a diagram illustrating an example 400 of beam management in an NTN, in accordance with the present disclosure. As shown, a satellite 405 may serve a UE 120. The satellite 405 may include a base station 110 and may be, include, be included in, or be similar to, the satellite 320 shown in FIG. 3, the satellite 340 shown in FIG. 3, and/or the like.

As shown by reference number 410, the satellite 405 may use multiple antennas to form multiple beams (shown as "beam 0," "beam 1," . . . , "beam 6") that form a beam footprint on the earth. One or more different frequency intervals may be associated with each beam to mitigate interference between beams, thereby facilitating simultaneous transmission and reception capabilities. In some cases, one or more different beams may be associated with a frequency interval. The frequency intervals may be, or include, bandwidth parts (BWPs). Within each beam, multiple BWPs may be defined to accommodate different UE capabilities, quality of service (QoS) requirements, and/or the like. Orthogonal frequency division multiplexing (OFDM) subcarriers within the BWPs typically are orthogonal relative to one another.

As the satellite 405 moves, the beam footprint moves across the ground. A satellite may move as fast as, for example, 7 kilometers/second or faster. To mitigate resulting Doppler frequency shift, the satellite 405 may perform a frequency pre-compensation. As shown by reference number 415, the frequency pre-compensation may target a center 420 of a beam footprint. However, due to the difference in an elevation angle (shown as EA1 and EA2) corresponding to adjacent beams, the frequency pre-compensation for each beam may be different. Moreover, due to the difference in elevation angles and the motion of the satellite 405, subcarriers in one BWP (e.g., a BWP associated with Beam 0) may become non-orthogonal to subcarriers in another BWP (e.g., a BWP associated with Beam 1). Thus, as the satellite 405 moves, the orthogonality between subcarriers in adjacent BWPs may be compromised, resulting in interference between frequency resources. As a result, communications between the satellite 405 and the UE 120 may be unreliable and may involve increased latency and decreased throughput.

According to various aspects of the techniques and apparatuses described herein, a base station (which may include a non-terrestrial base station, such as a satellite, a terrestrial base station, and/or the like) may determine interfered frequency resources and indicate those frequency resources to a UE. In this way, a UE may communicate with the base station using a communication procedure that mitigates the effect of the interference. For example, in some aspects, the UE may rate match around interfered resources, assign a lower priority to bits associated with interfered resources, and/or the like. In some aspects, the base station may implicitly indicate the interfered resources by configuring BWPs to exclude the interfered frequency resources. In this way, aspects may facilitate management of frequency resource interference, allowing a base station and/or a UE to mitigate the interference. As a result, aspects may enable more reliable communications, with decreased latency and increased throughput.

As indicated above, FIG. 4 is provided as an example. Other examples may differ from what is described with regard to FIG. 4.

Figure 5:
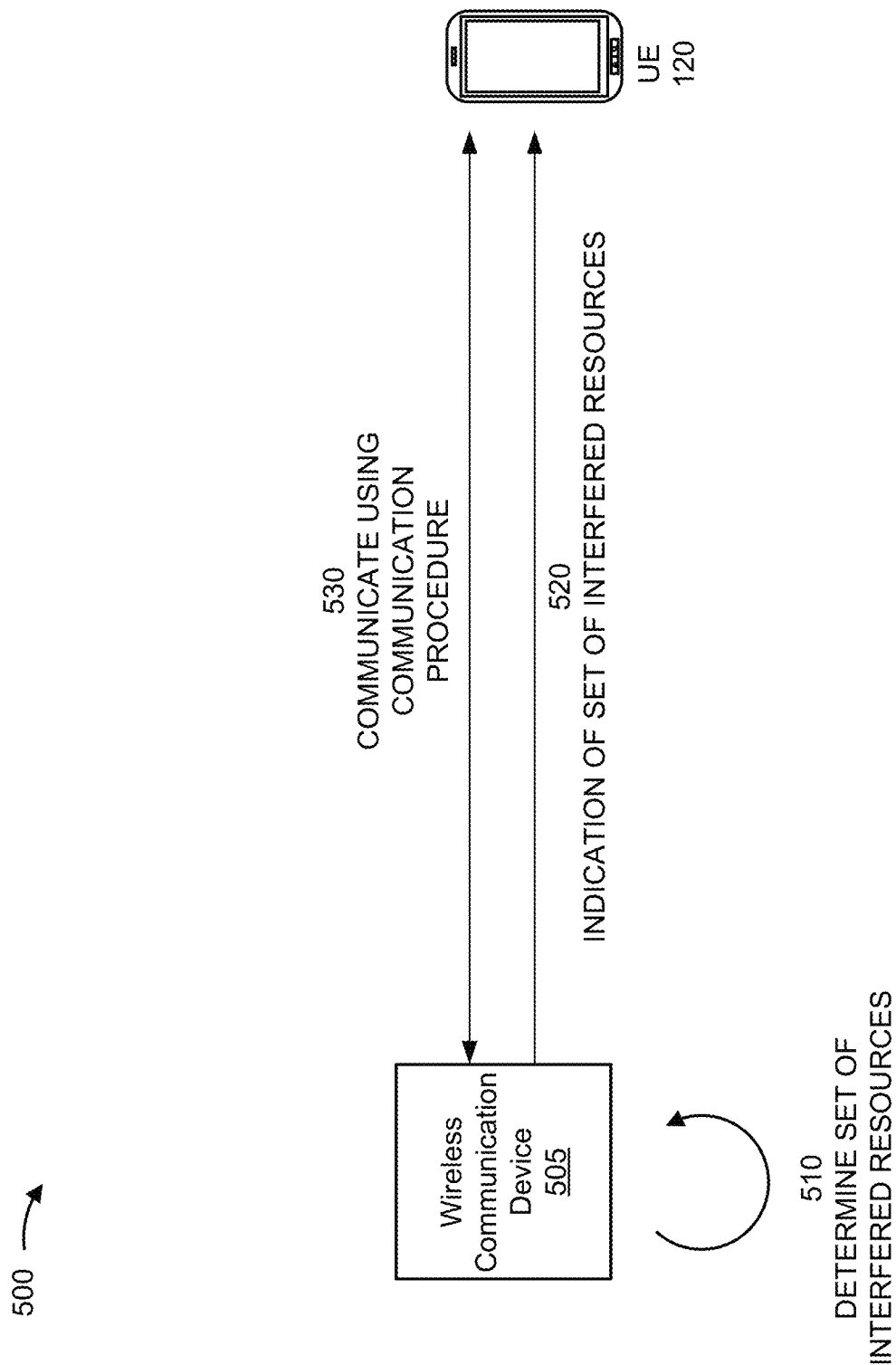
FIG. 5 is a diagram illustrating an example associated with management of frequency resource interference, in accordance with the present disclosure.

FIG. 5 is a diagram illustrating an example 500 associated with management of frequency resource interference, in accordance with the present disclosure. As shown, a wireless communication device 505 and a UE 120 may communicate with one another. The wireless communication device 505 may be a terrestrial base station, a non-terrestrial base station, a terrestrial relay station, a non-terrestrial relay station, and/or the like, and may include the satellite 320 shown in FIG. 3, the satellite 340 shown in FIG. 3, the satellite 405 shown in FIG. 4, and/or the like.

As shown by reference number 510, the wireless communication device 505 may determine a set of interfered frequency resources. Interfered frequency resources may include frequency resources that are subject to interference by a set of interfering frequency resources. In some aspects, the wireless communication device 505 may determine the set of interfered frequency resources based at least in part on a determination corresponding to a tolerance of an inter-carrier interference associated with a beam. In some aspects, the inter-carrier interference is based at least in part on a QoS requirement.

As shown by reference number 520, the wireless communication device 505 may transmit, and the UE 120 may receive, an indication of the set of interfered frequency resources. In some aspects, the indication of the set of interfered frequency resources may indicate a partially interfered resource block (RB), a fully interfered RB, an interfered subcarrier of a partially interfered RB, and/or the like. In some aspects, the indication may explicitly indicate the set of interfered frequency resources.

In some aspects, the indication may implicitly indicate the set of interfered frequency resources. For example, in some aspects, the wireless communication device 505 may indicate the set of interfered frequency resources by configuring one or more BWPs to exclude the set of interfered frequency resources. That is, in some aspects, a BWP configuration may be based at least in part on the set of interfered frequency resources (e.g., based at least in part on the indication of the set of interfered frequency resources). In some aspects, the BWP configuration may indicate a configured BWP that excludes at least a portion of the set of interfered frequency resources. In some aspects, the configured BWP may exclude a fully interfered RB, a subcarrier of a partially interfered RB, and/or the like.

As shown by reference number 530, the UE 120 may communicate with the wireless communication device 505 using a communication procedure that is based at least in part on the set of interfered frequency resources (e.g., the communication procedure is based at least in part on the indication of the set of interfered frequency resources). In some aspects, the indication of the set of interfered frequency resources may explicitly indicate the set of interfered frequency resources and the UE 120 may use that information to facilitate the communication procedure.

In some aspects, the UE 120 may communicate with the wireless communication device 505 using the communication procedure based at least in part on a determination that a modulation scheme to be used to communicate with the base station satisfies a condition. In some aspects, the UE 120 may make the determination that the modulation scheme satisfies the condition based at least in part on the modulation scheme comprising an order that is greater than or equal to an order of a sixty-four quadrature amplitude modulation scheme.

In some aspects, the UE 120 may communicate with the wireless communication device 505 using the communication procedure by rate matching around the set of interfered frequency resources. In some aspects, the UE 120 may rate match around the set of interfered frequency resources by rate matching around a fully interfered RB, a subcarrier of a partially interfered RB, and/or the like.

In some aspects, the UE 120 may communicate with the wireless communication device 505 using the communication procedure by assigning a first reliability level to bits associated with the set of interfered frequency resources that is lower than a second reliability level assigned to bits that are not associated with the set of interfered frequency resources. In some aspects, the UE 120 may assign the first reliability level by assigning the first reliability level to at least one of a fully interfered RB, a subcarrier of a partially interfered RB, and/or the like.

In some aspects, the UE 120 may assign the first reliability level by scaling a log likelihood ratio by a factor that is less than one. The log likelihood ratio may correspond to the bits associated with the set of interfered frequency resources. In some aspects, the UE 120 may use a puncturing procedure corresponding to the bits associated with the set of interfered frequency resources by scaling the log likelihood ratio by a factor that is equal to zero.

Aspects of the techniques described above may enable a wireless communication device to determine interfered frequency resources and indicate those frequency resources to a UE. In this way, a UE may communicate with the wireless communication device using a communication procedure that mitigates the effect of the interference. In some aspects, the wireless communication device may implicitly indicate the interfered resources by configuring BWPs to exclude the interfered frequency resources. In this way, aspects may facilitate management of frequency resource interference, allowing a wireless communication device and/or a UE to mitigate the interference. As a result, aspects may enable more reliable communications with decreased latency and increased throughput.

As indicated above, FIG. 5 is provided as an example. Other examples may differ from what is described with regard to FIG. 5.

Figure 6:
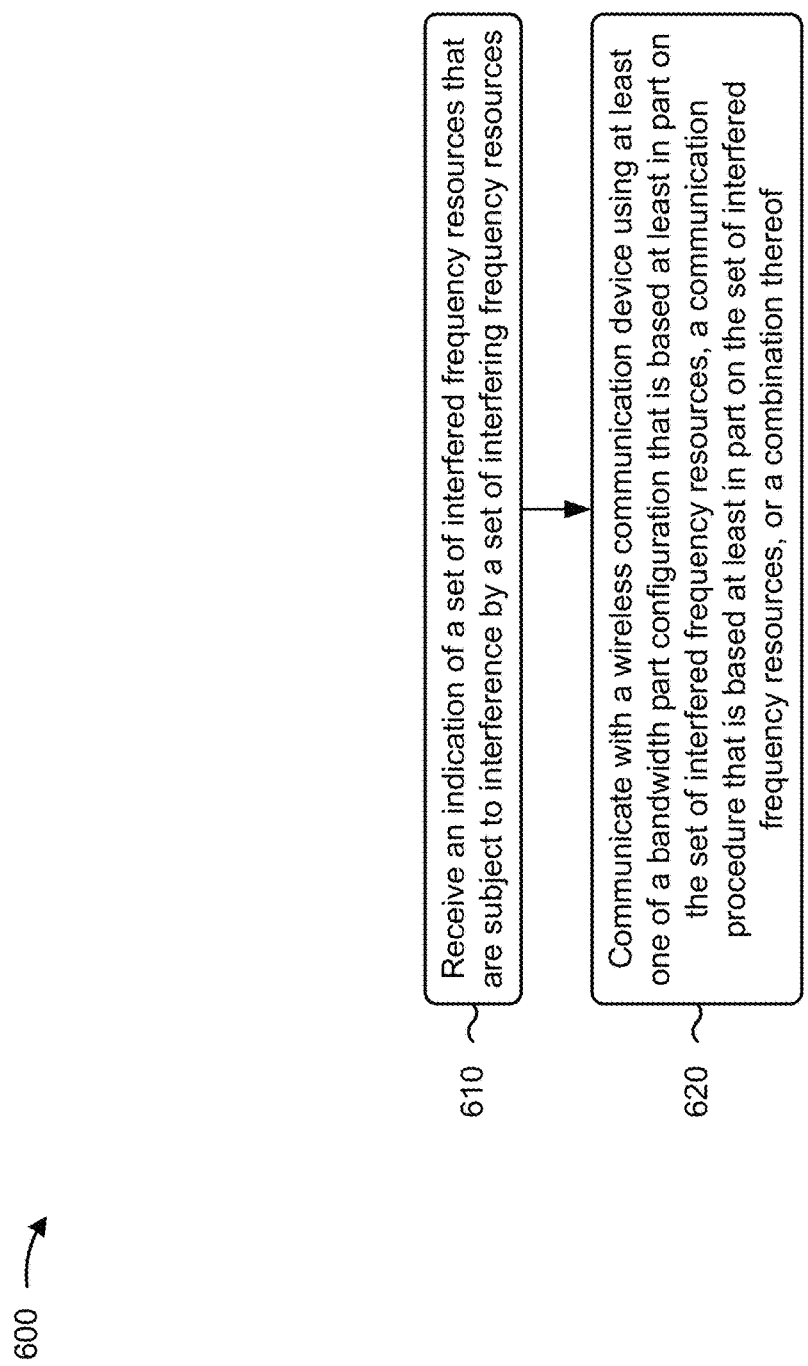
FIGS. 6 and 7 are diagrams illustrating examples associated with management of frequency resource interference, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with management of frequency resource interference.

As shown in FIG. 6, in some aspects, process 600 may include receiving an indication of a set of interfered frequency resources that are subject to interference by a set of interfering frequency resources (block 610). For example, the UE (e.g., using receive processor 258, controller/processor 280, memory 282, and/or the like) may receive an indication of a set of interfered frequency resources that are subject to interference by a set of interfering frequency resources, as described above.

As further shown in FIG. 6, in some aspects, process 600 may include communicating with a wireless communication device using at least one of: a bandwidth part configuration that is based at least in part on the set of interfered frequency resources, a communication procedure that is based at least in part on the set of interfered frequency resources, or a combination thereof (block 620). For example, the UE (e.g., using receive processor 258, transmit processor 264, controller/processor 280, memory 282, and/or the like) may communicate with a wireless communication device using at least one of: a bandwidth part configuration that is based at least in part on the set of interfered frequency resources, a communication procedure that is based at least in part on the set of interfered frequency resources, or a combination thereof, as described above.

Process 600 may include additional aspects, such as any single aspect or any combination of aspects described below and/or in connection with one or more other processes described elsewhere herein.

With respect to process 600, in some aspects, the indication of the set of interfered frequency resources indicates at least one of: a partially interfered RB, a fully interfered RB, an interfered subcarrier of a partially interfered RB, or a combination thereof.

With respect to process 600, in some aspects, the indication of the set of interfered frequency resources is based at least in part on a determination corresponding to a tolerance of an inter-carrier interference associated with a beam.

With respect to process 600, in some aspects, the inter-carrier interference is based at least in part on a quality of service requirement.

With respect to process 600, in some aspects, communicating with the wireless communication device using the communication procedure comprises rate matching around the set of interfered frequency resources.

With respect to process 600, in some aspects, rate matching around the set of interfered frequency resources comprises rate matching around at least one of a fully interfered RB, a subcarrier of a partially interfered RB, or a combination thereof.

With respect to process 600, in some aspects, communicating with the wireless communication device using the communication procedure comprises assigning a first reliability level to bits associated with the set of interfered frequency resources that is lower than a second reliability level assigned to bits that are not associated with the set of interfered frequency resources.

With respect to process 600, in some aspects, assigning the first reliability level comprises assigning the first reliability level to at least one of a fully interfered RB, a subcarrier of a partially interfered RB, or a combination thereof.

With respect to process 600, in some aspects, assigning the first reliability level comprises scaling a log likelihood ratio by a factor that is less than one, wherein the log likelihood ratio corresponds to the bits associated with the set of interfered frequency resources.

With respect to process 600, in some aspects, process 600 includes using a puncturing procedure corresponding to the bits associated with the set of interfered frequency resources by scaling the log likelihood ratio by a factor that is equal to zero.

With respect to process 600, in some aspects, communicating with the wireless communication device using the communication procedure comprises communicating with the wireless communication device based at least in part on a determination that a modulation scheme to be used to communicate with the wireless communication device satisfies a condition.

With respect to process 600, in some aspects, the modulation scheme satisfies the condition based at least in part on the modulation scheme comprising an order that is greater than or equal to an order of a sixty-four quadrature amplitude modulation scheme.

With respect to process 600, in some aspects, the bandwidth part configuration indicates a configured bandwidth part that excludes at least a portion of the set of interfered frequency resources.

With respect to process 600, in some aspects, the configured bandwidth part excludes at least one of a fully interfered RB, a subcarrier of a partially interfered RB, or a combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
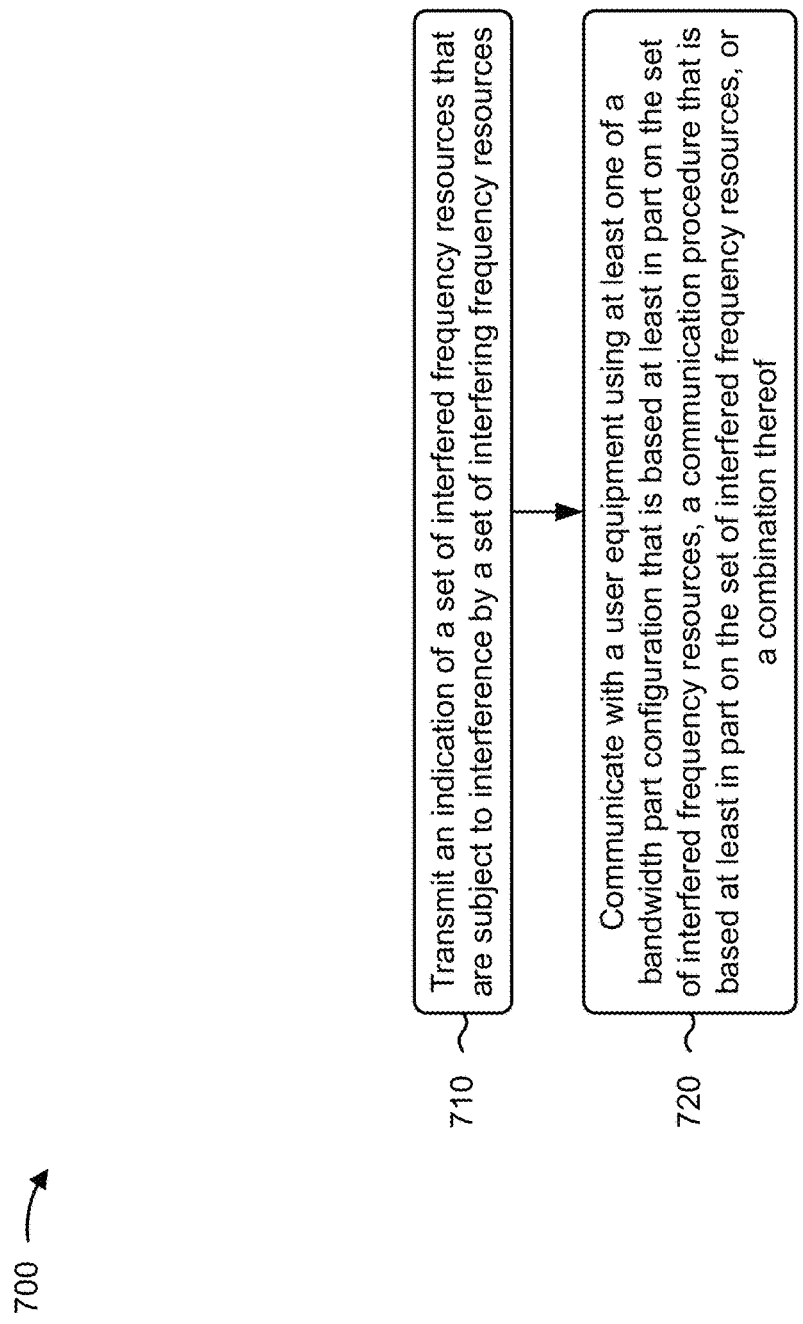

FIG. 7 is a diagram illustrating an example process 700 performed, for example, by a wireless communication device, in accordance with the present disclosure. Example process 700 is an example where the wireless communication device (e.g., base station 110, a non-terrestrial base station, a non-terrestrial relay station, and/or the like) performs operations associated with management of frequency resource interference.

As shown in FIG. 7, in some aspects, process 700 may include transmitting an indication of a set of interfered frequency resources that are subject to interference by a set of interfering frequency resources (block 710). For example, the wireless communication device (e.g., using transmit processor 220, controller/processor 240, memory 242, and/or the like) may transmit an indication of a set of interfered frequency resources that are subject to interference by a set of interfering frequency resources, as described above.

As further shown in FIG. 7, in some aspects, process 700 may include communicating with a UE using at least one of: a bandwidth part configuration that is based at least in part on the set of interfered frequency resources, a communication procedure that is based at least in part on the set of interfered frequency resources, or a combination thereof (block 720). For example, the wireless communication device (e.g., using transmit processor 220, receive processor 238, controller/processor 240, memory 242, and/or the like) may communicate with a UE using at least one of: a bandwidth part configuration that is based at least in part on the set of interfered frequency resources, a communication procedure that is based at least in part on the set of interfered frequency resources, or a combination thereof, as described above.

Process 700 may include additional aspects, such as any single aspect or any combination of aspects described below and/or in connection with one or more other processes described elsewhere herein.

With respect to process 700, in some aspects, the indication of the set of interfered frequency resources indicates at least one of: a partially interfered resource block, a fully interfered RB, an interfered subcarrier of a partially interfered RB, or a combination thereof.

With respect to process 700, in some aspects, process 700 includes determining the set of interfered frequency resources.

With respect to process 700, in some aspects, determining the set of interfered frequency resources is based at least in part on determining a tolerance of an inter-carrier interference associated with a beam.

With respect to process 700, in some aspects, the inter-carrier interference is based at least in part on a quality of service requirement.

With respect to process 700, in some aspects, communicating with the UE using the communication procedure comprises rate matching around the set of interfered frequency resources.

With respect to process 700, in some aspects, rate matching around the set of interfered frequency resources comprises rate matching around at least one of a fully interfered RB, a subcarrier of a partially interfered RB, or a combination thereof.

With respect to process 700, in some aspects, communicating with the UE using the communication procedure comprises assigning a first reliability level to bits associated with the set of interfered frequency resources that is lower than a second reliability level assigned to bits that are not associated with the set of interfered frequency resources.

With respect to process 700, in some aspects, assigning the first reliability level comprises assigning the first reliability level to at least one of a fully interfered RB, a subcarrier of a partially interfered RB, or a combination thereof.

With respect to process 700, in some aspects, assigning the first reliability level comprises scaling a log likelihood ratio by a factor that is less than one, wherein the log likelihood ratio corresponds to the bits associated with the set of interfered frequency resources.

With respect to process 700, in some aspects, process 700 includes using a puncturing procedure corresponding to the bits associated with the set of interfered frequency resources by scaling the log likelihood ratio by a factor that is equal to zero.

With respect to process 700, in some aspects, communicating with the UE using the communication procedure is based at least in part on a determination that a modulation scheme to be used to communicate with the UE satisfies a condition.

With respect to process 700, in some aspects, the modulation scheme satisfies the condition based at least in part on the modulation scheme comprising an order that is greater than or equal to an order of a sixty-four quadrature amplitude modulation scheme.

With respect to process 700, in some aspects, the bandwidth part configuration indicates a configured bandwidth part that excludes at least a portion of the set of interfered frequency resources.

With respect to process 700, in some aspects, the configured bandwidth part excludes at least one of a fully interfered RB, a subcarrier of a partially interfered RB, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment, comprising: receiving an indication of a set of interfered frequency resources that are subject to interference by a set of interfering frequency resources; and communicating with a wireless communication device using at least one of: a bandwidth part configuration that is based at least in part on the set of interfered frequency resources, a communication procedure that is based at least in part on the set of interfered frequency resources, or a combination thereof.

Aspect 2: The method of Aspect 1, wherein the indication of the set of interfered frequency resources indicates at least one of: a partially interfered resource block, a fully interfered resource block, an interfered subcarrier of a partially interfered resource block, or a combination thereof.

Aspect 3: The method of either of Aspects 1 or 2, wherein the indication of the set of interfered frequency resources was based at least in part on a determination corresponding to a tolerance of an inter-carrier interference associated with a beam.

Aspect 4: The method of Aspect 3, wherein the inter-carrier interference is based at least in part on a quality of service requirement.

Aspect 5: The method of any of Aspects 1-4, wherein communicating with the wireless communication device using the communication procedure comprises rate matching around the set of interfered frequency resources.

Aspect 6: The method of Aspect 5, wherein rate matching around the set of interfered frequency resources comprises rate matching around at least one of: a fully interfered resource block, a subcarrier of a partially interfered resource block, or a combination thereof.

Aspect 7: The method of any of Aspects 1-6, wherein communicating with the wireless communication device using the communication procedure comprises assigning a first reliability level to bits associated with the set of interfered frequency resources that is lower than a second reliability level assigned to bits that are not associated with the set of interfered frequency resources.

Aspect 8: The method of Aspect 7, wherein assigning the first reliability level comprises assigning the first reliability level to at least one of: a fully interfered resource block, a subcarrier of a partially interfered resource block, or a combination thereof.

Aspect 9: The method of Aspect 8, wherein assigning the first reliability level comprises scaling a log likelihood ratio by a factor that is less than one, wherein the log likelihood ratio corresponds to the bits associated with the set of interfered frequency resources.

Aspect 10: The method of Aspect 9, further comprising using a puncturing procedure corresponding to the bits associated with the set of interfered frequency resources by scaling the log likelihood ratio by a factor that is equal to zero.

Aspect 11: The method of any of Aspects 1-10, wherein communicating with the wireless communication device using the communication procedure comprises communicating with the wireless communication device based at least in part on a determination that a modulation scheme to be used to communicate with the wireless communication device satisfies a condition.

Aspect 12: The method of Aspect 11, wherein the modulation scheme satisfies the condition based at least in part on the modulation scheme comprising an order that is greater than or equal to an order of a sixty-four quadrature amplitude modulation scheme.

Aspect 13: The method of Aspect 12, wherein the bandwidth part configuration indicates a configured bandwidth part that excludes at least a portion of the set of interfered frequency resources.

Aspect 14: The method of Aspect 13, wherein the configured bandwidth part excludes at least one of: a fully interfered resource block, a subcarrier of a partially interfered resource block, or a combination thereof.

Aspect 15: A method of wireless communication performed by a wireless communication device, comprising: transmitting an indication of a set of interfered frequency resources that are subject to interference by a set of interfering frequency resources; and communicating with a user equipment using at least one of: a bandwidth part configuration that is based at least in part on the set of interfered frequency resources, a communication procedure that is based at least in part on the set of interfered frequency resources, or a combination thereof.

Aspect 16: The method of Aspect 15, wherein the indication of the set of interfered frequency resources indicates at least one of: a partially interfered resource block, a fully interfered resource block, an interfered subcarrier of a partially interfered resource block, or a combination thereof.

Aspect 17: The method of either of Aspects 15 or 16, further comprising determining the set of interfered frequency resources.

Aspect 18: The method of Aspect 17, wherein determining the set of interfered frequency resources is based at least in part on determining a tolerance of an inter-carrier interference associated with a beam.

Aspect 19: The method of Aspect 18, wherein the inter-carrier interference is based at least in part on a quality of service requirement.

Aspect 20: The method of any of Aspects 15-19, wherein communicating with the user equipment using the communication procedure comprises rate matching around the set of interfered frequency resources.

Aspect 21: The method of Aspect 20, wherein rate matching around the set of interfered frequency resources comprises rate matching around at least one of: a fully interfered resource block, a subcarrier of a partially interfered resource block, or a combination thereof.

Aspect 22: The method of any of Aspects 15-21, wherein communicating with the user equipment using the communication procedure comprises assigning a first reliability level to bits associated with the set of interfered frequency resources that is lower than a second reliability level assigned to bits that are not associated with the set of interfered frequency resources.

Aspect 23: The method of Aspect 22, wherein assigning the first reliability level comprises assigning the first reliability level to at least one of: a fully interfered resource block, a subcarrier of a partially interfered resource block, or a combination thereof.

Aspect 24: The method of Aspect 23, wherein assigning the first reliability level comprises scaling a log likelihood ratio by a factor that is less than one, wherein the log likelihood ratio corresponds to the bits associated with the set of interfered frequency resources.

Aspect 25: The method of Aspect 24, further comprising using a puncturing procedure corresponding to the bits associated with the set of interfered frequency resources by scaling the log likelihood ratio by a factor that is equal to zero.

Aspect 26: The method of any of Aspects 15-25, wherein communicating with the user equipment using the communication procedure is based at least in part on a determination that a modulation scheme to be used to communicate with the user equipment satisfies a condition.

Aspect 27: The method of Aspect 26, wherein the modulation scheme satisfies the condition based at least in part on the modulation scheme comprising an order that is greater than or equal to an order of a sixty-four quadrature amplitude modulation scheme.

Aspect 28: The method of any of Aspects 15-27, wherein the bandwidth part configuration indicates a configured bandwidth part that excludes at least a portion of the set of interfered frequency resources.

Aspect 29: The method of Aspect 28, wherein the configured bandwidth part excludes at least one of: a fully interfered resource block, a subcarrier of a partially interfered resource block, or a combination thereof.

Aspect 30: An apparatus for wireless communication at a device, comprising a processor; memory coupled with the processor; and instructions stored in the memory and executable by the processor to cause the apparatus to perform the method of one or more of Aspects 1-14.

Aspect 31: A device for wireless communication, comprising a memory and one or more processors coupled to the memory, the one or more processors configured to perform the method of one or more of Aspects 1-14.

Aspect 32: An apparatus for wireless communication, comprising at least one means for performing the method of one or more of Aspects 1-14.

Aspect 33: A non-transitory computer-readable medium storing code for wireless communication, the code comprising instructions executable by a processor to perform the method of one or more of Aspects 1-14.

Aspect 34: A non-transitory computer-readable medium storing a set of instructions for wireless communication, the set of instructions comprising one or more instructions that, when executed by one or more processors of a device, cause the device to perform the method of one or more of Aspects 1-14.

Aspect 35: An apparatus for wireless communication at a device, comprising a processor; memory coupled with the processor; and instructions stored in the memory and executable by the processor to cause the apparatus to perform the method of one or more of Aspects 15-28.

Aspect 36: A device for wireless communication, comprising a memory and one or more processors coupled to the memory, the one or more processors configured to perform the method of one or more of Aspects 15-28.

Aspect 37: An apparatus for wireless communication, comprising at least one means for performing the method of one or more of Aspects 15-28.

Aspect 38: A non-transitory computer-readable medium storing code for wireless communication, the code comprising instructions executable by a processor to perform the method of one or more of Aspects 15-28.

Aspect 39: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment, comprising:
   a memory; and
   one or more processors coupled to the memory, the one or more processors configured to:
      receive an indication of a set of interfered frequency resources that are subject to interference by a set of interfering frequency resources, the set of interfered frequency resources being subject to the interference by the set of interfering frequency resources based at least in part on a difference between an elevation angle associated with a beam associated with the set of interfered frequency resources and an elevation angle associated with a beam associated with the set of interfering frequency resources; and
      communicate with a wireless communication device using at least one of:
         a bandwidth part configuration that is based at least in part on the set of interfered frequency resources,
         a communication procedure that is based at least in part on the set of interfered frequency resources, or
         a combination thereof.

2. The apparatus of claim 1, wherein the indication of the set of interfered frequency resources indicates at least one of:
   a partially interfered resource block,
   a fully interfered resource block,
   an interfered subcarrier of a partially interfered resource block, or
   a combination thereof.

3. The apparatus of claim 1, wherein the indication of the set of interfered frequency resources was based at least in part on a determination corresponding to a tolerance of an inter-carrier interference associated with a beam.

4. The apparatus of claim 3, wherein the inter-carrier interference is based at least in part on a quality of service requirement.

5. The apparatus of claim 1, wherein the one or more processors are configured to communicate with the wireless communication device using the communication procedure by rate matching around the set of interfered frequency resources.

6. The apparatus of claim 5, wherein the one or more processors are configured to rate match around the set of interfered frequency resources by rate matching around at least one of:
   a fully interfered resource block,
   a subcarrier of a partially interfered resource block, or
   a combination thereof.

7. The apparatus of claim 1, wherein the one or more processors are configured to communicate with the wireless communication device using the communication procedure by assigning a first reliability level to bits associated with the set of interfered frequency resources that is lower than a second reliability level assigned to bits that are not associated with the set of interfered frequency resources.

8. The apparatus of claim 7, wherein the one or more processors are configured to assign the first reliability level by assigning the first reliability level to at least one of:
   a fully interfered resource block,
   a subcarrier of a partially interfered resource block, or
   a combination thereof.

9. The apparatus of claim 7, wherein the one or more processors are configured to assign the first reliability level by scaling a log likelihood ratio by a factor that is less than one, wherein the log likelihood ratio corresponds to the bits associated with the set of interfered frequency resources.

10. The apparatus of claim 9, wherein the one or more processors are configured to use a puncturing procedure corresponding to the bits associated with the set of interfered frequency resources by scaling the log likelihood ratio by a factor that is equal to zero.

11. The apparatus of claim 1, wherein the one or more processors are configured to communicate with the wireless communication device using the communication procedure based at least in part on a determination that a modulation scheme to be used to communicate with the wireless communication device satisfies a condition.

12. The apparatus of claim 11, wherein the modulation scheme satisfies the condition based at least in part on the modulation scheme comprising an order that is greater than or equal to an order of a sixty-four quadrature amplitude modulation scheme.

13. The apparatus of claim 11, wherein the configured bandwidth part excludes at least one of:

a fully interfered resource block,
a subcarrier of a partially interfered resource block, or
a combination thereof.

14. The apparatus of claim 1, wherein the bandwidth part configuration indicates a configured bandwidth part that excludes at least a portion of the set of interfered frequency resources.

15. An apparatus for wireless communication at a wireless communication device, comprising:
a memory; and
one or more processors coupled to the memory, the one or more processors configured to:
transmit an indication of a set of interfered frequency resources that are subject to interference by a set of interfering frequency resources, the set of interfered frequency resources being subject to the interference by the set of interfering frequency resources based at least in part on a difference between an elevation angle associated with a beam associated with the set of interfered frequency resources and an elevation angle associated with a beam associated with the set of interfering frequency resources; and
communicate with a user equipment using at least one of:
a bandwidth part configuration that is based at least in part on the set of interfered frequency resources,
a communication procedure that is based at least in part on the set of interfered frequency resources, or
a combination thereof.

16. The apparatus of claim 15, wherein the indication of the set of interfered frequency resources indicates at least one of:
a partially interfered resource block,
a fully interfered resource block,
an interfered subcarrier of a partially interfered resource block, or
a combination thereof.

17. The apparatus of claim 15, the one or more processors are configured to determine the set of interfered frequency resources.

18. The apparatus of claim 17, wherein the one or more processors are configured to determine the set of interfered frequency resources based at least on a determination corresponding to a tolerance of an inter-carrier interference associated with a beam.

19. The apparatus of claim 18, wherein the inter-carrier interference is based at least in part on a quality of service requirement.

20. The apparatus of claim 15, wherein the one or more processors are configured to communicate with the user equipment using the communication procedure by rate matching around the set of interfered frequency resources.

21. The apparatus of claim 20, wherein the one or more processors are configured to rate match around the set of interfered frequency resources by rate matching around at least one of:
a fully interfered resource block,
a subcarrier of a partially interfered resource block, or
a combination thereof.

22. The apparatus of claim 15, wherein the one or more processors are configured to communicate with the user equipment using the communication procedure by assigning a first reliability level to bits associated with the set of interfered frequency resources that is lower than a second reliability level assigned to bits that are not associated with the set of interfered frequency resources.

23. The apparatus of claim 22, wherein the one or more processors are configured to assign the first reliability level by assigning the first reliability level to at least one of:
a fully interfered resource block,
a subcarrier of a partially interfered resource block, or
a combination thereof.

24. The apparatus of claim 23, wherein the one or more processors are configured to assign the first reliability level by scaling a log likelihood ratio by a factor that is less than one, wherein the log likelihood ratio corresponds to the bits associated with the set of interfered frequency resources.

25. The apparatus of claim 24, wherein the one or more processors are configured to use a puncturing procedure corresponding to the bits associated with the set of interfered frequency resources by scaling the log likelihood ratio by a factor that is equal to zero.

26. The apparatus of claim 15, wherein the one or more processors are configured to communicate with the user equipment using the communication procedure based at least in part on a determination that a modulation scheme to be used to communicate with the user equipment satisfies a condition.

27. The apparatus of claim 26, wherein the modulation scheme satisfies the condition based at least in part on the modulation scheme comprising an order that is greater than or equal to an order of a sixty-four quadrature amplitude modulation scheme.

28. The apparatus of claim 15, wherein the bandwidth part configuration indicates a configured bandwidth part that excludes at least a portion of the set of interfered frequency resources, wherein the configured bandwidth part excludes at least one of:
a fully interfered resource block,
a subcarrier of a partially interfered resource block, or
a combination thereof.

29. A method of wireless communication performed by a user equipment, comprising:
receiving an indication of a set of interfered frequency resources that are subject to interference by a set of interfering frequency resources, the set of interfered frequency resources being subject to the interference by the set of interfering frequency resources based at least in part on a difference between an elevation angle associated with a beam associated with the set of interfered frequency resources and an elevation angle associated with a beam associated with the set of interfering frequency resources; and
communicating with a wireless communication device using at least one of:
a bandwidth part configuration that is based at least in part on the set of interfered frequency resources,
a communication procedure that is based at least in part on the set of interfered frequency resources, or
a combination thereof.

30. A method of wireless communication performed by a wireless communication device, comprising:
transmitting an indication of a set of interfered frequency resources that are subject to interference by a set of interfering frequency resources, the set of interfered frequency resources being subject to the interference by the set of interfering frequency resources based at least in part on a difference between an elevation angle associated with a beam associated with the set of interfered frequency resources and an elevation angle associated with a beam associated with the set of interfering frequency resources; and communicating with a user equipment using at least one of:
- a bandwidth part configuration that is based at least in part on the set of interfered frequency resources,
- a communication procedure that is based at least in part on the set of interfered frequency resources, or
- a combination thereof.

* * * * *